US010156879B2

United States Patent
Navarro (10) Patent No.: US 10,156,879 B2
(45) Date of Patent: Dec. 18, 2018

(54) SYSTEMS, METHODS AND COMPUTER PROGRAM PRODUCTS FOR CONTROLLING POWER SYSTEM COMPONENTS USING ABSTRACTED POWER NETWORK ENTITY DESCRIPTORS

(71) Applicant: Eaton Corporation, Cleveland, OH (US)

(72) Inventor: George Arthur Navarro, Raleigh, NC (US)

(73) Assignee: Eaton Intelligent Power Limited (IE)

( * ) Notice: Subject to any disclaimer, the term of this patent is extended or adjusted under 35 U.S.C. 154(b) by 680 days.

(21) Appl. No.: 14/132,057

(22) Filed: Dec. 18, 2013

(65) Prior Publication Data

US 2015/0169020 A1 Jun. 18, 2015

(51) Int. Cl.
*G06F 1/26* (2006.01)
*H02J 13/00* (2006.01)
*H02J 3/00* (2006.01)

(52) U.S. Cl.
CPC ............... *G06F 1/266* (2013.01); *G06F 1/26* (2013.01); *H02J 13/0006* (2013.01); *H02J 2003/007* (2013.01); *Y02E 60/76* (2013.01); *Y04S 40/22* (2013.01); *Y10T 307/305* (2015.04)

(58) Field of Classification Search
CPC ........ G06F 1/266; G06F 1/26; H02J 13/0006; H02J 2003/007; Y02E 60/76; Y04S 40/22; Y10T 307/305
USPC ......................................................... 307/18
See application file for complete search history.

(56) References Cited

U.S. PATENT DOCUMENTS

| 4,827,152 A | 5/1989 | Farkas |
| 5,373,198 A | 12/1994 | Lopez Jimenez |
| 7,560,831 B2 * | 7/2009 | Whitted .................. H02J 9/061 307/64 |

(Continued)

FOREIGN PATENT DOCUMENTS

| CN | 102959239 | 3/2013 |
| EP | 0939477 | 9/1999 |
| WO | WO 2012/102654 | 8/2012 |

OTHER PUBLICATIONS

International Preliminary Report on Patentability Corresponding to International Application No. PCT/US2014/069435; dated Jun. 30, 2016; 7 Pages.

(Continued)

*Primary Examiner* — Jared Fureman
*Assistant Examiner* — Emmanuel R Dominique
(74) *Attorney, Agent, or Firm* — Ward and Smith, P.A.

(57) ABSTRACT

An apparatus includes at least one device configured to be coupled to at least one electric power bus and to perform a plurality of electrical functions in association with the at least one electric power bus. A control system is operatively associated with the at least one device and configured to electronically communicate using descriptors from a power network domain that is abstracted with respect to the at least one device and to responsively operate the at least one device as an entity in the power network domain. The entity may include, for example, a power routing entity, a power conversion entity or a metering entity. The at least one device may include, for example, a switch, an active circuit, a passive circuit, a protective device and/or a sensor. Methods and computer program products are also described.

13 Claims, 5 Drawing Sheets

(56) References Cited

U.S. PATENT DOCUMENTS

| | | | |
|---|---|---|---|
| 7,886,173 B2 | 2/2011 | Krieger et al. | |
| 8,344,546 B2 | 1/2013 | Sarti | |
| 9,071,083 B2* | 6/2015 | Harris | G06F 1/305 |
| 2003/0212473 A1* | 11/2003 | Vandevanter | G06F 1/12 |
| | | | 700/293 |
| 2005/0188689 A1 | 9/2005 | Juby et al. | |
| 2009/0129032 A1 | 5/2009 | Liedtke et al. | |
| 2013/0091258 A1 | 4/2013 | Shaffer et al. | |
| 2013/0204444 A1* | 8/2013 | Ahn | H04L 12/2816 |
| | | | 700/286 |
| 2015/0286759 A1* | 10/2015 | Rehtanz | G06F 17/5022 |
| | | | 703/18 |

OTHER PUBLICATIONS

Chinese Office Action, corresponding CN Appln No. 201480075805.0; dated Apr. 27, 2018; 8 pages.

\* cited by examiner

SYSTEMS, METHODS AND COMPUTER PROGRAM PRODUCTS FOR CONTROLLING POWER SYSTEM COMPONENTS USING ABSTRACTED POWER NETWORK ENTITY DESCRIPTORS

BACKGROUND

The inventive subject matter relates to electrical power systems, methods and computer program products for controlling the same and, more particularly, to controlling devices interconnected by electric power buses.

Conventional electrical power systems used in commercial applications, such as data centers, typically include various types of devices, such as switchgear units, transformers, power distribution units (PDUs) and uninterruptible power supplies (UPSs). These are typically single purpose units and are selected and interconnected to suit a particular application. For example, a conventional UPS used in data center power system may include a cabinet or a modular arrangement of cabinets that has a relatively fixed topology, e.g., a particular interconnection of rectifier, inverter and battery converter circuits that is designed to provide a power output from a primary source, such as a utility source, and a secondary source, such as a battery. The primary and secondary power sources may be connected to the UPS and other power network components using switchgear and other network components that typically are selected for the particular application. While such power network components may be operationally accessible to an external control system, such as a building management system (BMS), the access may be limited. Such units may be difficult to integrate with other devices.

Large data centers have proliferated with the advent of web services and cloud computing. Some newer large data centers occupy millions of square feet and house hundreds of thousands of servers. These centers may have varying power requirements. For example, a data center may host both fault-tolerant applications, such as social media and video services, and fault-intolerant applications, such as financial applications. Energy consumption is a major concern for such facilities, as some facilities are approaching the 100 MW level, where even a few percentage points of lost efficiency can translate into significant expense. It may be desirable to power servers hosting fault-intolerant applications using highly reliable systems, such as on-line UPSs. However, running fault-tolerant applications on servers with a highly-reliable UPS may be relatively inefficient. Various solutions for providing power in data centers with relatively high efficiency and redundancy are proposed, for example, in U.S. Pat. No. 7,886,173 to Krieger et al., U.S. Pat. No. 7,560,831 to Whitted et al. and U.S. Pat. No. 8,344,546 to Sarti. These solutions, however, may be relatively inflexible and may not provide a sufficient breadth of capabilities, such as current limiting and other protective features.

SUMMARY

Some embodiments of the inventive subject matter provide an apparatus including at least one device configured to be coupled to at least one electric power bus and to perform a plurality of electrical functions in association with the at least one electric power bus. A control system is operatively associated with the at least one device and configured to electronically communicate using descriptors from a power network domain that is abstracted with respect to the at least one device and to responsively operate the at least one device as an entity in the power network domain. The entity may include, for example, a power routing entity, a power conversion entity or a metering entity. The at least one device may include, for example, a switch, an active circuit, a passive circuit, a protective device and/or a sensor.

According to further embodiments, a power system includes at least one electric power bus and at least one assembly connected to the at least one electric power bus and comprising at least one device configured to perform at least one electrical function in association with the at least one electric power bus. The at least one assembly is configured to be controlled responsive to communications that use descriptors from a power network domain that is abstracted with respect to the at least one devices of the assemblies.

Some embodiments provide methods of operating a power network comprising at least one assembly connected to at least one electric power bus and comprising at least one device that performs at least one electrical function in association with the at least one electric power bus. The methods include communicating with the assembly using descriptors from a power network domain that is abstracted with respect to the at least one device and responsively operating the at least one device as an entity in the power network domain.

The inventive subject matter may also be embodied as a non-transitory medium comprising computer-executable program code embodied therein configured to execute on a data processing device that controls at least one assembly connected to at least one electric power bus and comprising at least one device that performs at least one electrical function in association with the at least one electric power bus. The computer-executable program code may include computer program code configured to cause the at least one assembly to electronically communicate using descriptors from a power network domain that is abstracted with respect to the at least one device and computer program code configured to cause the at least one assembly to operate as an entity in the power network domain responsive to the communication.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

The inventive subject matter may be embodied as apparatus, methods and computer program products. Some embodiments may be described with reference to block diagrams and/or operational illustrations that illustrate structures and operations. Each block in such diagrams may represent a module, segment, or portion of code, which comprises one or more computer-executable program code for implementing the specified logical function(s). It is to be understood that each block of the block diagrams/or operational illustrations, and combinations of blocks in the block diagrams and/or operational illustrations can be embodied using analog circuitry and/or digital circuitry. Computer-executable program code may be provided to a controller circuit, which may include one or more general purpose processors, special purpose processors, ASICs, and/or other programmable data processing apparatus, such that the instructions, which execute via the controller, create means for implementing the functions/acts specified in the block diagrams and/or operational block or blocks.

These computer-executable program code may also be stored in a non-transitory medium that may direct a controller circuit to function in a particular manner, such that the program code stored in the non-transitory medium constitute an article of manufacture including instructions that implement the functions specified in the block or blocks of the block diagrams and/or operational illustrations. The non-transitory medium may be, but is not limited to, an electronic, magnetic, optical, electromagnetic, or semiconductor system, apparatus, or device. More specific examples (a non-exhaustive list) of the non-transitory medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

Some embodiments of the inventive subject matter arise from an inventive realization of a need to provide power distribution constructs that more effectively address the varying needs of modern electrical power applications, such as large data centers. For example, conventional "box" based UPS and switchgear implementations may be limited in meeting the needs of modern data center architectures in which computing processes may be distributed across multiple computing nodes, and in which the distribution of such processes may be vary over time. Some embodiments of the inventive subject matter may meet such flexible power needs by utilizing power network domain entities that are abstracted from lower-level devices, such as active circuits, switches, protective devices, storage devices and the like. Such entities may be used to aggregate functions of such devices to provide particular types of behavioral entities, such as UPSs, transfer switches and the like, that may be accessed and controlled in a manner without requiring specific reference to the lower devices.

Figure 1:
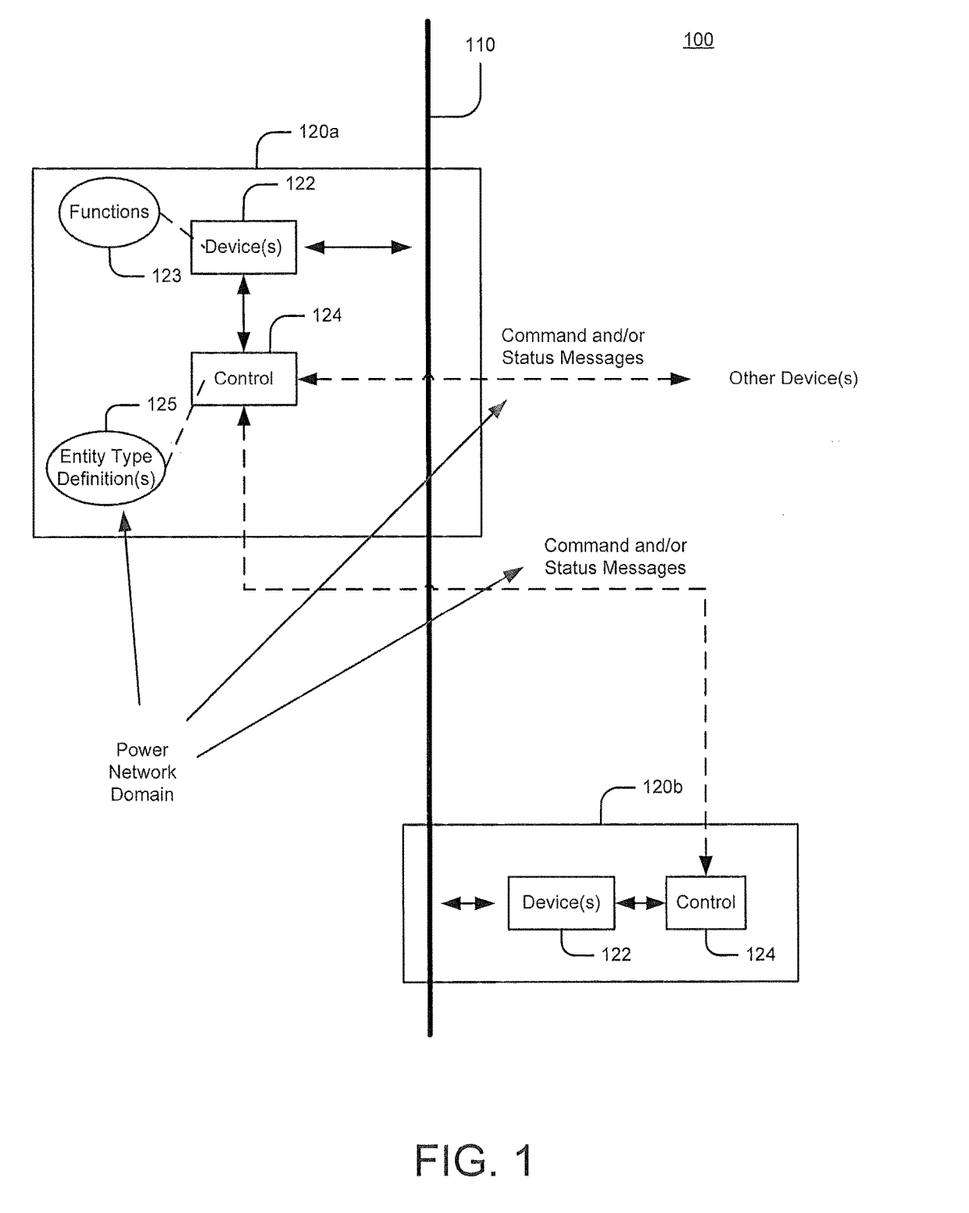
FIG. 1 is a schematic diagram illustrating a power system according to some embodiments.

FIG. 1 illustrates a power system 100 according to some embodiments of the inventive subject matter. The power system 100 includes at least one electrical power bus 110 and one or more components 120a, 120b, each of which includes one or more devices 122 that are coupled to the at least one bus 110. The devices 122 are configured to perform one or more functions 123 in association with the at least one bus 110, and may include, for example, switches (e.g., electromechanical and solid state switches), active circuits (e.g., transistor circuits), passive circuits (e.g., inductor and capacitor circuits), protective devices (e.g., breakers, fuses and surge arrestors), storage devices (e.g., batteries and flywheels), sensors (e.g., voltage sensors, current sensors and temperature sensors) and the like. Each component 120a, 120b further includes a control system 124 that is configured to control the one or more devices 122.

According to some embodiments, the control systems 124 may be configured to control the devices 122 as one or more entities in a power network domain that is abstracted from the one or more devices 122. In particular, the control system 124 may be configured to communicate with other devices in accordance with entity type descriptors from the abstracted power network domain, and to responsively control the underlying devices 122 such that they collectively operate as the corresponding entities in the abstracted power network domain. Thus, for example, the underlying devices 122 of the components 120a, 120b may be flexibly and dynamically accessed and operated using the higher level constructs of the power network domain, without reference to the specific operations of the underlying devices 122, with the control system 124 mediating the interaction between the abstracted power network domain and the devices 122.

It will be understood that the components 120a, 120b may comprise individual physical assemblies of devices and/or combinations of such assemblies that are collectively controlled by a control system distributed across such multiple assemblies. The control systems may include, for example, microprocessors, microcontrollers or other computing devices, along with interface circuitry for controlling the various devices therein.

Figure 2:
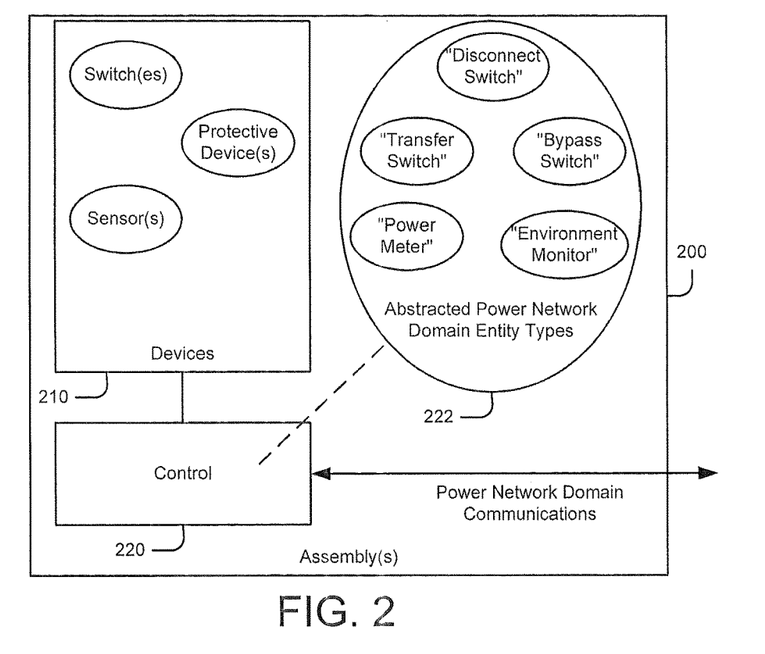
FIGS. 2 and 3 are schematic diagrams illustrating power component assemblies according to some embodiments.

FIG. 2 illustrates an example of how devices aggregated in one or more assemblies may be used according to some embodiments. One or more assemblies 200 may include a collection of devices 210 commonly provided in switchgear, such as circuit protective devices, switches and sensors. These devices 210 may be configurable to implement a variety of different higher-level network constructs, such as transfer switches, disconnect switches, bypass switches, power meters and environmental monitors, depending on a particular application and/or a current state of a particular application. A control system 220 of the one or more assemblies 200 may be configured to communicate with other entities, including other similar assemblies and/or other devices, such as supervisory control systems, using the higher level power network constructs. Based on these communications, The control system 220 may operate the various constituent devices 210 to provide the desired entity behavior in the abstracted power network domain.

Figure 3:
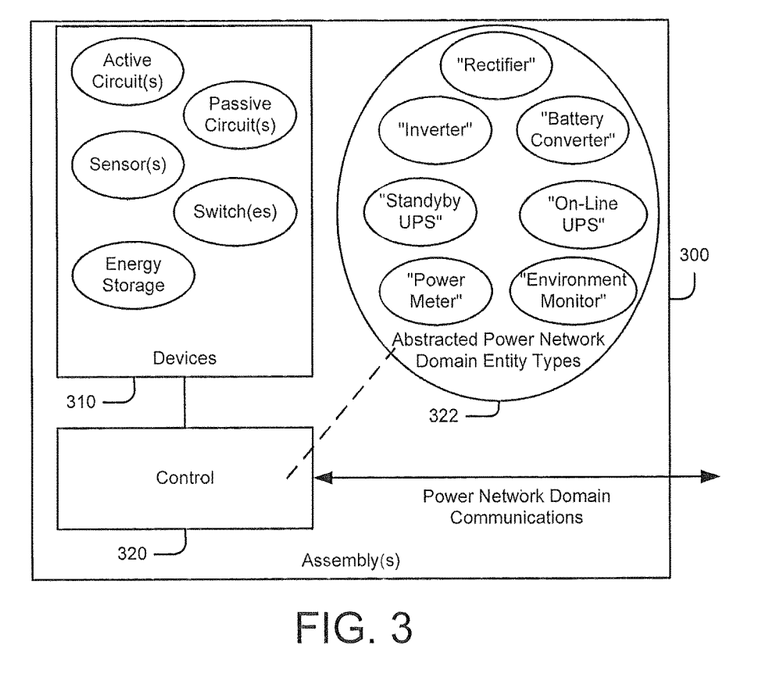

FIG. 3 illustrates another example. One more assemblies 300 may include devices 310 that may be used in various power converter applications, such as in rectifiers, inverters, uninterruptible power supplies and the like. As shown, the devices 310 may include active circuits (e.g., transistor circuits), passive circuits (e.g., inductor and capacitor circuits), switches (e.g., electromechanical and solid state switches), energy storage devices (e.g., batteries and flywheels) and various sensors (e.g., voltage, current and temperature sensors). A control circuit 320 may operate these devices 310 to provide behavior conforming to various abstracted entities, such as rectifiers, inverters, battery converters, standby UPSs, on-line UPSs, power meters and environment monitors. External communications of the control system 320 may be conducted in terms of these higher level constructs. An example of such an assembly might be a modular assembly that includes a collection of power conversion circuits and associated devices that may be flexibly interconnected and used to implement various UPS topologies, as well as to implement monitoring entities, such as meters.

Figure 4:
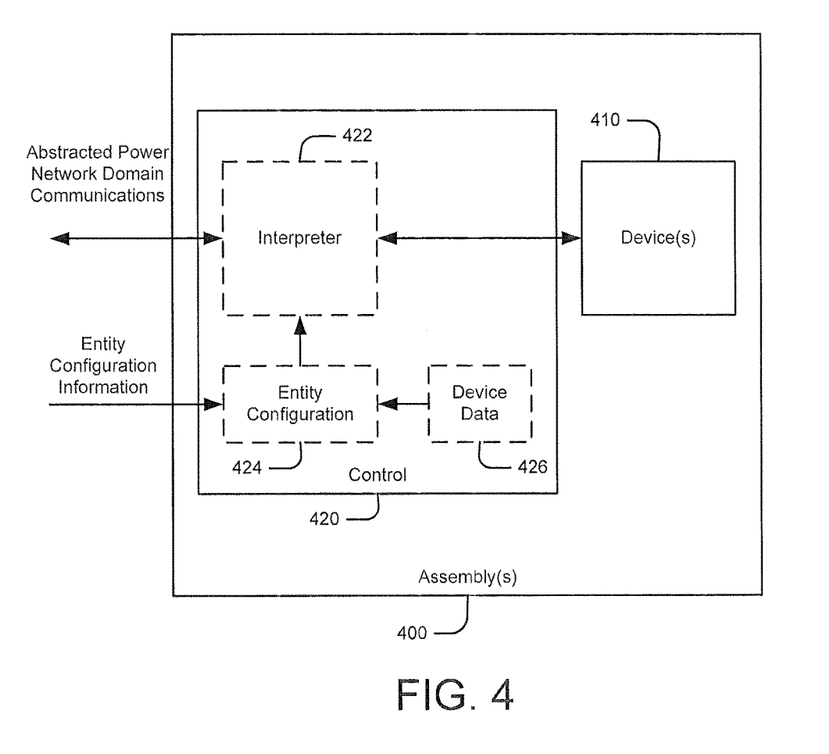
FIG. 4 is a schematic diagram illustrating control apparatus for implementing a power network component according to some embodiments.

FIG. 4 illustrates an example of how entity abstraction may be implemented according to some embodiments. One or more assemblies 400 include one or more devices 410 that are configured to perform various functions in association with one or more electrical power buses. The devices 410 may include any of variety of different pieces of electrical hardware and/or combinations of electrical hardware, such as switches, breakers, converter circuits, energy storage devices, impedances, protective devices and the like. A control system 420, which may include, for example, one or more data processing devices (e.g., microprocessors, microcontrollers, etc, and associated memory), is configured to control the one or more devices 410.

Figure 5:
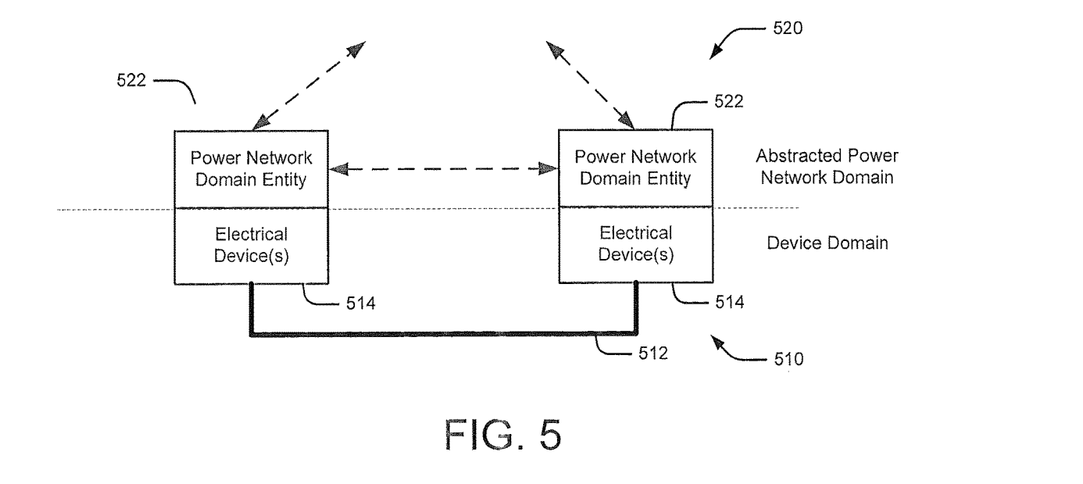
FIG. 5 is a schematic diagram illustrating a conceptual model for power systems according to some embodiments.

As further shown, the control system 420 may provide an entity configuration function 424 (e.g., one or more computer processes) that is operative to instantiate power network entities that are abstracted from the one or more devices 410 based on device data 426 pertaining to the one or more device 410. As shown, the entity configuration function 424 may operate responsive to externally-supplied configuration information, such as configuration commands supplied via a local and/or remote user interface. The instantiated entities are used by an interpreter function 422, which operates the one or more devices 410 responsive to external communications that use abstract domain entity references that refer to the instantiated entities. Thus, for example, some of the functions of some of the devices 410 may be grouped to provide an entity functionality that does not require external devices in communication with the control system 420 to access specific operations of the devices 410. As shown in FIG. 5, such apparatus may provide a layered arrangement of a device domain 510 including at least one electrical power bus 512 and electrical devices 514 associated therewith, and an abstracted power network domain 520 comprising various power network domain entities 522 that are abstracted from the underlying electrical devices 514.

Figure 6:
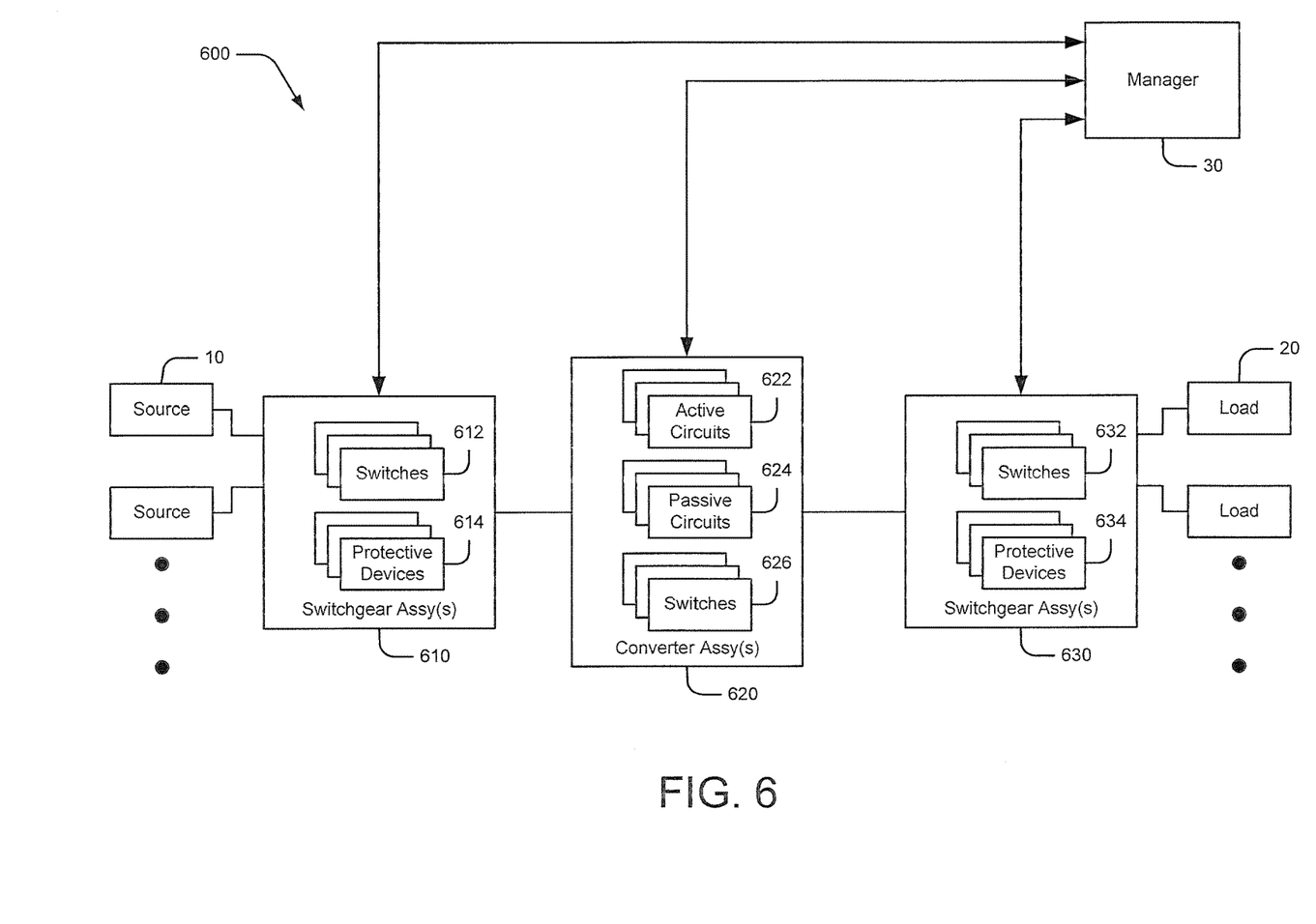
FIG. 6 is a schematic diagram illustrating an exemplary implementation of a power network according to some embodiments.
Figure 7:
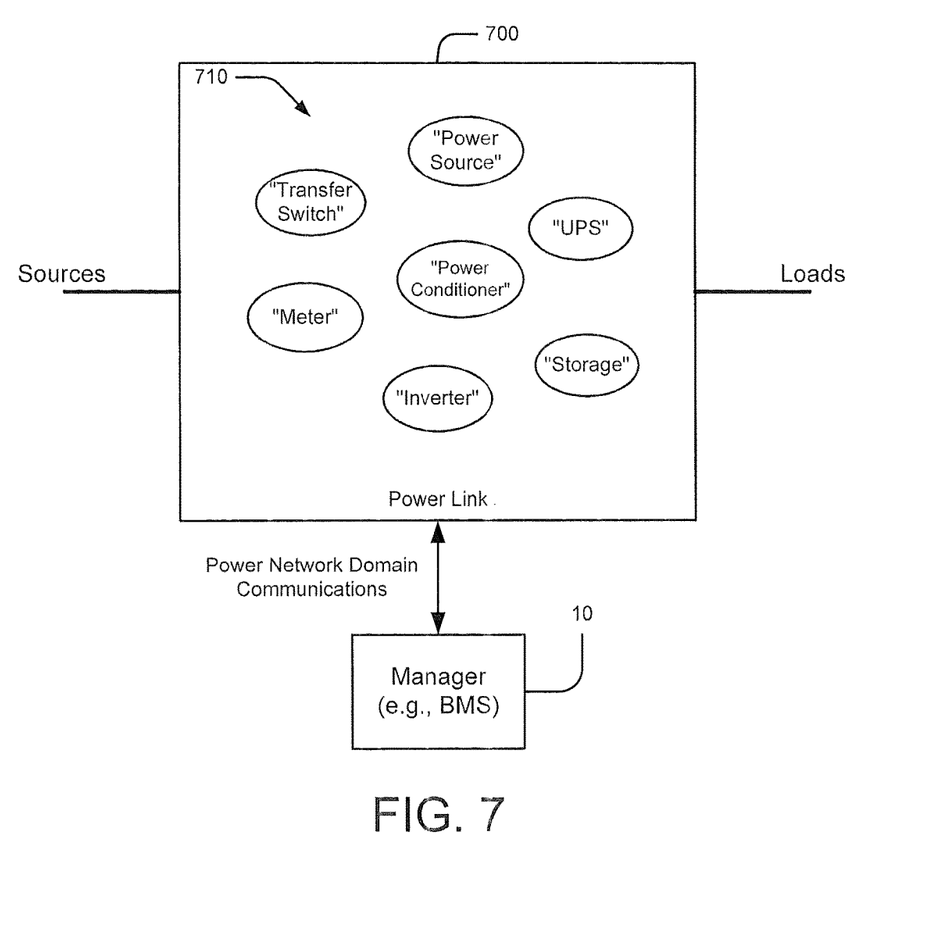
FIG. 7 is a schematic illustration of a power link construct according to some embodiments.

FIG. 6 illustrates an example of a power network 600 implemented using component assemblies according to some embodiments. The network 600 includes one or more switchgear assemblies 610 configured to be coupled to one or more sources 10. The switchgear assembly(s) 610 includes devices such as switches 612 and protective devices 614, the functions of which may be aggregated using abstracted power network domain entities as described above. The switchgear assembly(s) 610 may be configured to selectively route power to one or more converter assemblies 620 coupled thereto. The converter assembly(s) 620 may include, for example, active circuits 622, passive circuits 624 and switches 626 and may be configured to combine functions of these devices to provide abstracted power network domain entities the perform power conversion functions, such as inverters, rectifiers, UPSs, active filters, and the like. The converter assembly(s) 620 may be coupled to one or more switchgear assemblies 630, which may include, for example, various switches 632 and protective device 634 that selectively route power from the converter assembly(s) 620 to various loads 20. The switchgear and converter assemblies 610, 620, 630 may also include sensors and other devices that may be used to implement various metering entities. A system manager 30 (e.g., a building management system) may control the switchgear and converter assemblies 610, 620, 630 using abstract power network domain communications along the lines described above. The switchgear and converter assemblies 610, 620, 630 may also communicate with one another using such communications.

According to some embodiments of the inventive subject matter, control techniques along the lines discussed above with reference to FIGS. 1-6 may used to implement a flexible and dynamically adaptable power link 700 that ties one or more sources to one or more loads. The power link 700 may be configured to provide various and varying levels of redundancy, protection and other characteristics to the loads. The power link 700 may be controlled by an external manager 10, such as a building management system, using the abstracted constructs that make up the power link 700. This can relieve the manager 10 of the need to use device-specific communications. It can also enable the use of electrical power equipment, such as switchgear and converter assemblies, that may be flexibly configurable to serve a variety of different applications, rather than using relatively fixed, special-purpose "boxes," such as some conventional UPS systems.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An assembly comprising:
   a collection of devices configured to be coupled to at least one electric power bus and to perform a plurality of electrical functions in association with the at least one electric power bus; and
   a control system operatively associated with the collection of devices and configured to perform electronic communications with the collection of devices that reference groups of the collection of devices as respective ones of a plurality of different power network functional entities that perform aggregations of functions of the devices of corresponding ones of the groups and to operate the collection of devices such that the collection of devices selectively behaves as the power network functional entities responsive to the communications, wherein the devices are configured to be arranged in a variety of different arrangements, wherein the control system is operative to be configured responsive to communications from an external source to instantiate different power network functional entity definitions to correspond to the different arrangements of the devices, wherein the control system is configured to cause a first group of the collection of devices to behave as a first one of the power network functional entities responsive to first communications associated with the first one of the power network functional entities and to cause a second group of the collection of devices to behave as a second one of the power network functional entities responsive to second communications associated with the second one of the power network functional entities, and wherein the first one of the power network functional entities comprises a first one of a power routing entity, a power conversion entity and a metering entity and wherein the second one of the power network functional entities comprises a second one of the power routing entity, the power conversion entity and the metering entity.

2. The assembly of claim 1, wherein the control system is integrated with the collection of devices in a single assembly.

3. The assembly of claim 2, wherein the single assembly comprises a switchgear assembly or a power converter assembly.

4. The assembly of claim 1, wherein the plurality of electrical functions comprises a sensing function and/or a control function.

5. The assembly of claim 1, wherein the collection of devices comprises a switch, an active circuit, a passive circuit, a protective device and/or a sensor.

6. A method of operating a power network comprising at least one assembly connected to at least one electric power bus and comprising a collection of devices that perform a plurality of electrical functions in association with the at least one electric power bus, the method comprising:

communicating with the at least one assembly using electronic communications that reference groups of the collection of devices as respective ones of a plurality of power network functional entities that perform aggregations of functions of the devices of corresponding ones of the groups;

operating the collection of devices so that the collection of devices selectively behaves as the power network functional entities in response to the communications; and instantiating different power network functional entity definitions to correspond to different arrangements of the devices responsive to communications from a source external to the at least one assembly, including causing a first group of the collection of devices to behave as a first one of the power network functional entities responsive to first communications associated with the first one of the power network functional entities and to cause a second group of the collection of devices to behave as a second one of the power network functional entities responsive to second communications associated with the second one of the power network functional entities, wherein the first one of the power network functional entities comprises a first one of a power routing entity, a power conversion entity and a metering entity and wherein the second one of the power network functional entities comprises a second one of the power routing entity, the power conversion entity and the metering entity.

7. The method of claim 6, wherein the power network functional entities comprise a power routing entity, a power conversion entity or a metering entity.

8. The method of claim 6, wherein the plurality of electrical functions comprises a sensing function and/or a control function.

9. The method of claim 6, wherein the collection of devices comprises a switch, an active circuit, a passive circuit, a protective device and/or a sensor.

10. A non-transitory medium comprising computer-executable program code embodied therein configured to execute on a data processing device that controls at least one assembly that is connected to at least one electric power bus that comprises a collection of devices that perform a plurality of electrical functions in association with the at least one electric power bus, the computer-executable program code comprising:

computer program code configured to cause the at least one assembly to electronically communicate using communications that reference groups of the collection of devices as respective ones of a plurality of power network functional entities that perform functions that are aggregations of functions of the devices of corresponding ones of the groups;

computer program code configured to cause the collection of devices to operate to selectively behave as the power network functional entities responsive to the communications; and computer program code configured to instantiate different power network functional entity definitions to correspond to different arrangements of the devices responsive to communications from a source external to the at least one assembly such that a first group of the collection of devices behaves as a first one of the power network functional entities responsive to first communications associated with the first one of the power network functional entities and a second group of the collection of devices behaves as a second one of the power network functional entities responsive to second communications associated with the second one of the power network functional entities, wherein the first one of the power network functional entities comprises a first one of a power routing entity, a power conversion entity and a metering entity and wherein the second one of the power network functional entities comprises a second one of the power routing entity, the power conversion entity and the metering entity.

11. The non-transitory medium of claim 10, wherein the power network functional entities comprise a power routing entity, a power conversion entity or a metering entity.

12. The non-transitory medium of claim 10, wherein the plurality of electrical functions comprises a sensing function and/or a power control function.

13. The non-transitory medium of claim 10, wherein the collection of devices comprises a switch, an active circuit, a passive circuit, a protective device and/or a sensor.

* * * * *